(12) United States Patent
Miyazaki

(10) Patent No.: US 8,110,627 B2
(45) Date of Patent: Feb. 7, 2012

(54) RUBBER COMPOSITION FOR TIRE

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 241 days.

(21) Appl. No.: 12/501,843

(22) Filed: Jul. 13, 2009

(65) Prior Publication Data

US 2010/0071827 A1 Mar. 25, 2010

(30) Foreign Application Priority Data

Sep. 19, 2008 (JP) .................. 2008-240745

(51) Int. Cl.
*C08K 3/34* (2006.01)
*B60C 1/00* (2006.01)
(52) U.S. Cl. ...................... 524/493; 152/565
(58) Field of Classification Search .................... 524/493
See application file for complete search history.

(56) References Cited

U.S. PATENT DOCUMENTS

| 6,956,093 B1 | 10/2005 | Hsu et al. | |
|---|---|---|---|
| 2006/0047056 A1* | 3/2006 | Miyazaki | 524/495 |
| 2010/0006199 A1* | 1/2010 | Ohta et al. | 152/522 |

FOREIGN PATENT DOCUMENTS

| EP | 1 808 312 | 7/2007 |
|---|---|---|
| EP | 1 961 785 A1 | 8/2008 |
| EP | 1 970 405 | 9/2008 |
| EP | 2 072 289 | 6/2009 |
| JP | 2000-344955 A | 12/2000 |
| JP | 2006-63143 A | 3/2006 |

* cited by examiner

*Primary Examiner* — Ling Choi
*Assistant Examiner* — Hui Chin
(74) *Attorney, Agent, or Firm* — Birch, Stewart, Kolasch & Birch, LLP

(57) ABSTRACT

A rubber composition for a tire superior in low heat build-up (tan δ) and superior in fracture strength is provided. A rubber composition for a tire comprising (B) 5 to 80 parts by mass of silica based on 100 parts by mass of (A) including (a) 10 to 60% by mass of a butadiene rubber including 2.5 to 20% by mass of 1,2-syndiotactic polybutadiene crystals, (b) 5 to 60% by mass of a modified diene rubber and (c) 20 to 75% by mass of a diene rubber other than (a) and (b).

4 Claims, 2 Drawing Sheets

RUBBER COMPOSITION FOR TIRE

BACKGROUND OF THE INVENTION

The present invention relates to a rubber composition for a tire.

The securement of steering stability and fracture strength (durability) other than low fuel cost performance is important for an SUV tire and a tire for a high grade vehicle requiring high durability (areas also including a severe heat area and a punishing road area).

Fracture strength relates to cutting resistance and separation growth resistance and a method for securing the fracture strength includes methods such as (1) silica is replaced with carbon black and (2) the content of filler is reduced and rigidity and crack growth performance lowered is compensated with a butadiene rubber including 1,2-syndiotactic polybutadiene crystals (for example, refer to the patent document 1).

However, both of the increase of E* and the reduction of tan δ cannot be satisfied by the method (1) described above and since the dispersibility of filler is and tan δ is easily deteriorated by the method (2) described above, both of the increase of E* and the reduction of tan δ is not adequately satisfied yet.

Further, the lowering of E* caused by the decrease of the content of filler can be compensated with the butadiene rubber including 1,2-syndiotactic polybutadiene crystals to a certain degree, but when the content of filler is excessively decreased, the lowering of the fracture strength is induced.

Further, although a rubber composition including a butadiene rubber modified with tin at terminal as a diene rubber component and including carbon black as reinforcing filler is disclosed in the patent document 1, silica is not adequately dispersed in the diene rubber component when carbon black is replaced with silica as the reinforcing filler in the patent document 1, and both of the increase of E* and the reduction of tan δ was not adequately satisfied.

[Patent Document 1] Japanese Unexamined Patent Publication No. 2006-63143

SUMMARY OF THE INVENTION

It is the purpose of the present invention to provide a rubber composition for a tire superior in low heat build-up (tan δ) and superior in fracture strength.

The present invention relates to a rubber composition for a tire comprising (B) 5 to 80 parts by mass of silica based on 100 parts by mass of (A) (a) 10 to 60% by mass of a butadiene rubber comprising 2.5 to 20% by mass of 1,2-syndiotactic polybutadiene crystals, (b) 5 to 60% by mass of a modified diene rubber whose terminal is modified with a compound represented by the formula (1):

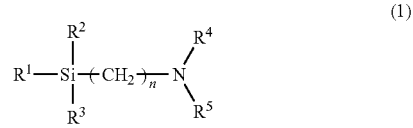

(1)

(Wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer) and (c) 20 to 75% by mass of a diene rubber other than (a) and (b).

The vinyl content of the modified butadiene rubber (b) is preferably at most 35% by mass.

The rubber composition is preferably used for a sidewall, a clinch, a base tread, a cushion or a tie gum.

The present invention relates also to a pneumatic tire using the rubber composition for a tire.

DESCRIPTION OF CODES

| | |
|---|---|
| 1 | Base tread |
| 2 | Sidewall |
| 3 | Cushion |
| 4 | Case cord |
| 5 | Band |
| 6 | Breaker |
| 7 | Inner liner |
| 8 | Cap tread |
| 9 | Tie gum |
| 10 | Clinch |
| 11 | Bead core |
| 12 | Bead apex |
| 13 | Carcass ply |
| 14 | Chafer |

The sidewall, clinch, base tread, cushion and tie gum in the tire using the rubber composition of the present invention as for sidewall, clinch, base tread, cushion and tie gum are illustrated below using drawings.

Figure 1:
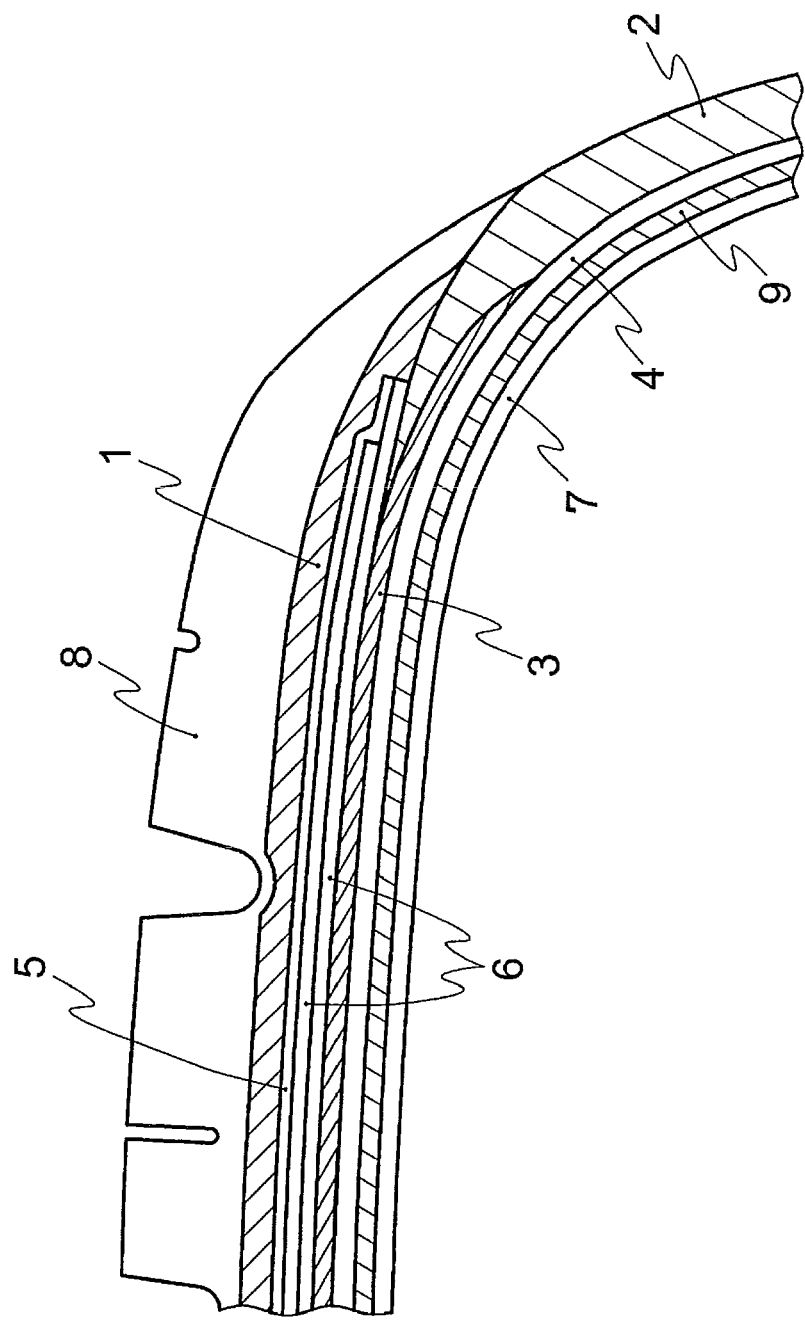
[FIG. 1] It is the partial sectional view of the tire showing a structure having clinch using the rubber composition for a tire of the present invention.

FIG. 1 is the partial sectional view of the tire exhibiting a structure having a sidewall, a base tread, a cushion and a tie gum using the rubber composition for a tire of the present invention.

As shown in FIG. 1, in a tire having a tread, a sidewall 2, a cushion 3 provided at the inside of the tread and the sidewall 2, a case cord 4 provided at the inside of the cushion 3, a band 5 provided at the inside of the tread and the outside of the cushion 3, a breaker 6 provided at the inside of the band 5 and provided at the outside of the cushion 3 and an inner liner 7 provided at the inside of the case cord 4, the tread has a double layered structure comprising the base tread 1 and a cap tread 8; and the base tread 1 is a rubber layer provided at the inside of the cap tread 8 and provided at the outside of the and 5, has no necessity of improving abrasion resistance at the inside of the tread, has a role of making the whole tread portion be low heat build-up and has roles of absorbing impact from the tread and preventing the damage of band/breaker.

Further, as shown in FIG. 1, a tie gum 9 is a rubber layer provided at the outside of the inner liner 7 and provided at the inside of the case cord 4 in the fore-mentioned structure, has a role of intervening adhesion between the case cord and inner liner and has a role of securing flex resistance. In particular, when the rubber composition of the present invention is used as the tie gum, low heat build-up and crack growth is superior.

Further, as shown in FIG. 1, the sidewall 2 is a rubber layer provided at the outside of the cushion 3 in the tire structure and has roles of absorbing impact from ground surface by flex and preventing the case cord from external damage. In particular, when the rubber composition of the present invention is used as the sidewall, low heat build-up (nearly equal to LRR) and crack growth (nearly equal to durability) is superior.

Further, as shown in FIG. 1, the cushion 3 is a rubber layer provided at the outside of the case cord 4 and at the lower side of the breaker 6 in the tire structure and has a role of preventing the separation between the breaker 6 and the case. In particular, when the rubber composition of the present invention is used as the cushion, low heat build-up and crack growth is superior.

Figure 2:
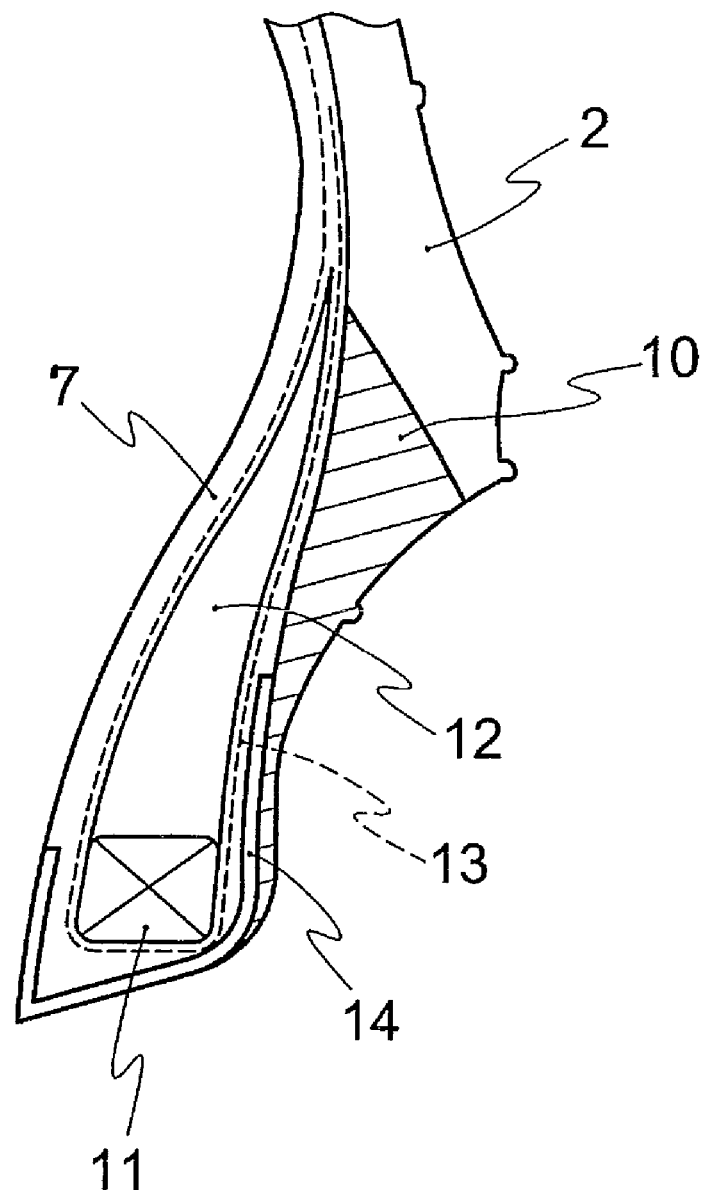
[FIG. 2] It is the partial sectional view of the tire showing a structure having clinch using the rubber composition for a tire of the present invention.

FIG. 2 is the partial sectional view of the tire showing a structure having a clinch using the rubber composition for a tire of the present invention.

As shown in FIG. 2, in a tire having a bead portion comprising a bead core 11 and a bead apex 12, a carcass ply 13 provided at the periphery of the bead portion and at the inside of the sidewall 2, the inner liner 7 provided at the inside of the sidewall 2 and a chafer 14 provided at a portion where the rim in a tire grazes, a clinch 10 is a rubber layer being adjacent with the carcass ply 13 and provided from the sidewall 2 to the bead portion and has a role of protecting a rim flange fitting portion.

DETAILED DESCRIPTION

The rubber composition for a tire of the present invention includes (A) (a) a butadiene rubber including 1,2-syndiotactic polybutadiene crystals (hereinafter, also called as SPB-including BR), (b) a modified diene rubber whose terminal is modified (hereinafter, also called as modified BR) and (c) a diene rubber other than (a) and (b) and (B) silica.

As the SPB-including BR (a) in the diene rubber component (A), the 1,2-syndiotactic polybutadiene crystals are not those in which crystals are merely dispersed in BR but are preferably bonded chemically and further dispersed. The generation of crack and propagation tends to be suppressed by the fact that the crystals are chemically bonded with the rubber component and further dispersed.

Further, since the 1,2-syndiotactic polybutadiene crystals included in BR have adequate hardness, adequate complex elastic modulus can be obtained even if crosslinking density is little. Accordingly, the abrasion resistance of the rubber composition can be improved.

The melting point of the 1,2-syndiotactic polybutadiene crystals is preferably at least 180° C. and more preferably at least 190° C. When the melting point is less than 180° C., crystals are melted during the vulcanization of a tire at press and hardness tends to be lowered. Further, the melting point of the 1,2-syndiotactic polybutadiene crystals is preferably at most 220° C. and more preferably at most 210° C. When the melting point exceeds 220° C., dispersibility tends to be deteriorated in the rubber composition since the molecular weight of BR is enlarged.

The content of article insoluble in boiling n-hexane in the SPB-including BR (a) is preferably at least 2.5% by mass and more preferably at least 8% by mass. When the content is less than 2.5% by mass, the adequate hardness of the rubber composition tends to be not obtained. Further, the content of the article insoluble in boiling n-hexane is preferably at most 22% by mass, more preferably at most 20% by mass and further preferably at most 18% by mass. When the content exceeds 22% by mass, the viscosity of BR itself is high and the dispersibility of BR and filler in the rubber composition tends to be deteriorated. Hereat, the article insoluble in boiling n-hexane indicates 1,2-syndiotactic polybutadiene in the SPB-including BR.

The content of the 1,2-syndiotactic polybutadiene crystals in the SPB-including BR (a) is at least 2.5% by mass and preferably at least 10% by mass. When the content is less than 2.5% by mass, hardness is inadequate. Further, the content of the 1,2-syndiotactic polybutadiene crystals is at most 20% by mass and preferably at most 18% by mass. When the content exceeds 20% by mass, BR is hardly dispersed in the rubber composition and processability is deteriorated.

The content of the SPB-including BR (a) in the diene rubber component (A) is at least 10% by mass, preferably at least 12% by mass and more preferably at least 15% by mass because it is superior in hardness Hs (nearly equal to complex elastic modulus E*) and crack growth. Further, the content of the SPB-including BR (a) in the diene rubber component is at most 60% by mass, preferably at most 50% by mass and more preferably at most 45% by mass because elongation at break is improved and no deterioration of tan δ is superior.

The present invention carries out robust formation with silica by including the modified BR (b). Further, the dispersibility of silica is accelerated at kneading and strength at break can be improved. The modified BR (b) is a butadiene rubber whose terminal is modified with a compound represented by the formula (1).

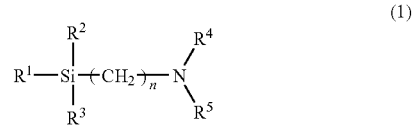

$R^1$, $R^2$ and $R^3$ of the formula (1) are same or different and are an alkyl group, an alkoxyl group, an acetal group, a carboxyl group, a mercapto group or a derivative thereof.

$R^4$ and $R^5$ in the formula (1) are same or different and are an alkyl group or a hydrogen atom.

n in the formula (1) is an integer.

The modified BR (b) modified with a compound represented by the formula (1):

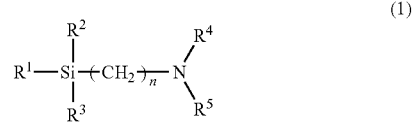

is preferable because bonding property with silica can be improved and the dispersibility is improved when silica is included as filler.

As the specific example of the formula (1), for example,

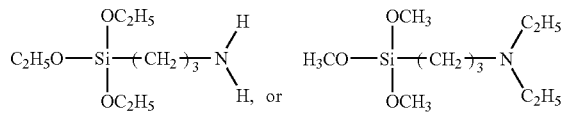

are mentioned.

The modification rate of the modified BR (b) modified with the compound represented by the formula (1) is preferably at least 30% and more preferably at least 50% because bonding quantity with silica is much and rolling resistance can be adequately reduced when silica is included. Further, the modification rate of the modified BR (b) modified with the compound represented by the formula (1) is preferably at most 80% and more preferably at most 70% because interaction with silica is adequately obtained and processability at kneading a rubber is not lowered when silica is included.

The molecular weight distribution (Mw/Mn) of the modified BR (b) modified with the compound represented by the formula (1) is preferably those having narrow molecular weight distribution, specifically at most 2.3 preferably and more preferably at most 2.2 because low molecular weight component is not increased and rolling resistance is not deteriorated. Further, the lower limit is not specifically limited but 1 is preferable.

Vinyl content in the modified BR (b) is preferably at most 35% by mass, more preferably at most 30% by mass and further preferably at most 25% by mass because rim chafing property is superior. Further, the vinyl content in the modified BR (b) is preferably at least 5% by mass, more preferably at least 7% by mass and further preferably at least 10% by mass.

The content of the modified BR (b) in the diene rubber component (A) is at least 5% by mass and preferably at least 10% by mass because low heat build-up can be improved. Further, the content of the modified BR (b) in the diene rubber component (A) is at most 60% by mass and preferably at most 55% by mass because the fracture strength of a rubber can be improved.

The diene rubber component (c) other than the SPB-including BR (a) and modified BR (b) described above includes preferably at least one diene rubber selected from a group comprising a natural rubber (NR), an isoprene rubber (IR), a styrene-butadiene rubber (SBR), a butadiene rubber with high cis content (high cis BR) and an epoxidized natural rubber (ENR).

NR is not specifically limited, those usually used in the rubber industry can be used and RSS #3 and TSR 20 are specifically mentioned.

Further, IR is also not specifically limited and those conventionally used in the rubber industry can be used.

The content of the diene rubber component (c) in the diene rubber component (A) is at least 20% by mass because it is superior in fracture strength and processability. Further, the content of NR and/or IR in the diene rubber component (A) is at most 75% by mass because it is superior in low heat build-up and can improve hardness.

High cis BR means BR in which the content of cis 1,4-bond for the butadiene portion of the rubber obtained is at least 90%.

The present invention can improve elongation at break (EB) and cutting property by including silica for the specified diene rubber component (A). Although tin-modified BR BR1250H conventionally used and silica were weak in bonding force and tan δ was deteriorated, effect of improving tan δ can be obtained by using modified BR that has strong bonding force with silica.

Silica is not specifically limited, but silica by a dry process (silicic acid anhydride, $SiO_2$) or silica by a wet process (silicic acid anhydride, $SiO_2$) are mentioned and silica by a wet process is preferable because a lot of silanol groups are contained in the silica by a wet process.

The content of silica is at least 5 parts by mass based on 100 parts by mass of the diene rubber component and preferably at least 10 parts by mass because effect by compounding silica is obtained. Further, the content of silica is at most 80 parts by mass based on 100 parts by mass of the diene rubber component and preferably at most 70 parts by mass because low heat build-up can be improved.

The nitrogen adsorption specific surface area ($N_2SA$) of silica is preferably at least 40 $m^2/g$ and more preferably at least 45 $m^2/g$ because fracture strength is improved. Further, the $N_2SA$ of silica is preferably at most 250 $m^2/g$ and more preferably at most 200 $m^2/g$ because low heat build-up can be improved.

Z115GR ($N_2SA$: 112 $m^2/g$) available from Rhodia S. A. and Ultrasil VN 3 ($N_2SA$: 210 $m^2/g$) available from Degussa Corporation are preferably used because reinforcing property and abrasion resistance exhibits adequate effect for being used for a tire for an automobile and processability and dispersibility is also good.

A silane coupling agent is preferably used in combination with silica when silica is further used as filler.

An arbitrary silane coupling agent conventionally used in combination with silica is preferably included as silica preferably used in the present invention and, for example, there are mentioned sulfides series such as bis(3-triethoxysilylpropyl)tetrasulfide, bis(2-triethoxysilylethyl)tetrasulfide, bis(4-triethoxysilylbutyl)tetrasulfide, bis(3-trimethoxysilylpropyl) tetrasulfide, bis(2-trimethoxysilylethyl)tetrasulfide, bis(4-trimethoxysilylbutyl)tetrasulfide, bis(3-triethoxysilylpropyl) trisulfide, bis(2-triethoxysilylethyl)trisulfide, bis(4-triethoxysilylbutyl)trisulfide, bis(3-trimethoxysilylpropyl) trisulfide, bis(2-trimethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl)disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane.

When the silane coupling agent is included, the content of the silane coupling agent is preferably at least 5 parts by mass based on 100 parts by mass of the content of silica and more preferably at least 8 parts by mass. When the content of the silane coupling agent is less than 5 parts by mass, fracture strength tends to be greatly lowered. Further, the content of the silane coupling agent is preferably at most 15 parts by mass and more preferably at most 10 parts by mass. When the content of the silane coupling agent exceeds 15 parts by mass, the effects such as the increase of fracture strength and the reduction of rolling resistance tend by adding the silane coupling agent to be not obtained.

Filler included in the present invention may include carbon black in addition to silica from the viewpoints of the improvement of reinforcing property, the securement of wheatherability and the prevention of optical deterioration.

The content of carbon black is preferably at least 5 parts by mass based on 100 parts by mass of the content of the diene rubber component (A), more preferably at least 10 parts by mass and further preferably at least 15 parts by mass because wheatherability is secured, optical deterioration is prevented and complex elastic modulus (E*) is high. Further, the content of carbon black is preferably at most 50 parts by mass based on 100 parts by mass of the diene rubber component (A), more preferably at most 45 parts by mass and further preferably at most 40 parts by mass because tan δ is low (low heat build-up) and high elongation at break (EB) is superior.

The $N_2SA$ of carbon black is preferably at least 30 $m^2/g$, more preferably at least 35 $m^2/g$ and further preferably at least 40 $m^2/g$ because complex elastic modulus (E*) is high and elongation at break (EB) is high. Further, the $N_2SA$ of carbon black is preferably at most 100 $m^2/g$, more preferably at most 90 $m^2/g$ and further preferably at most 80 $m^2/g$ because it is superior in a point that tan δ is low (low heat build-up).

The carbon black is preferably, for example, carbon blacks such as N550, N660 and N326 because both of high E* and high EB, and low tan δ is satisfied.

The total of the content of the filler for reinforcement such as silica and carbon black that are included in the present invention is preferably at least 25 parts by mass based on 100 parts by mass of the diene rubber component (A), more preferably at least 30 parts by mass and further preferably at least 35 parts by mass because it is superior in points that E* is high and EB is high. Further, the total of the content of the filler for reinforcement is preferably at most 60 parts by mass based on 100 parts by mass of the diene rubber component (A), more preferably at most 55 parts by mass and further preferably at most 50 parts by mass because it is superior in a point that tan δ is low.

The rubber composition for a tire of the present invention can include the amounts usually used of compounding agents generally used in the production of a rubber composition such as, for example, filler for reinforcement such as clay, an antioxidant, zinc oxide, stearic acid, aromatic oil, wax, a curing agent such as sulfur and a vulcanization accelerator if necessary, in addition to the diene rubber components, fillers for reinforcement such as carbon black and silica and silane coupling agent.

The rubber composition of the present invention is produced by a general method. Namely, the rubber composition can be produced by kneading the fore-mentioned compounding agents with a Banbury mixer, a kneader and an open roll and then carrying out vulcanization.

Further, since the rubber composition is superior in low heat build-up and strength at break and also superior in crack growth, it is used for sidewall, clinch, base tread, cushion or tie gum.

Further, the present invention relates also to a pneumatic tire using the rubber composition for a tire.

The pneumatic tire of the present invention is produced by a usual method using the rubber composition of the present invention. Namely, the rubber composition of the present invention compounding the compounding agents if necessary is extruded and processed in matching with the shapes of the sidewall, clinch, base tread, cushion and tie gum of a tire at unvulcanization stage and molded on a tire molding machine by a usual method; thereby unvulcanized tire is formed. The unvulcanized tire is heated and pressurized in a vulcanizer to be able to obtain the pneumatic tire.

EXAMPLE

The present invention is specifically illustrated based on Examples, but the present invention is not limited only to these.

Then, various chemicals used in Examples and Comparative Examples are illustrated.

Natural rubber (NR): TSR20
Butadiene rubber (BR): Nipol BR1220 (vinyl content: 1% by mass and not modified) manufactured by Zeon Corporation.
SPB-containing BR: VCR 617 (the dispersion of 1,2-syndiotactic polybutadiene crystals, the content of 1,2-syndiotactic polybutadiene crystals: 17% by mass, the melting point of 1,2-syndiotactic polybutadiene crystals: 200° C., the content of article insoluble in boiling n-hexane: 15 to 18% by mass) manufactured by Ube Industries Ltd.
Methoxysilane-modified butadiene rubber (modified BR): modified BR (BR modified by a compound of the formula (5):

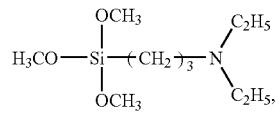

modification rate: 70 to 75%, Mw/Mn: 1.11 and vinyl content: 25 to 30%) manufactured by Sumitomo Chemical Co., Ltd.
Tin-modified butadiene rubber (tin-modified BR): BR 1250H (polymerization using lithium as an initiator, vinyl bond quantity: 10 to 13% by mass, Mw/Mn: 1.5, the content of tin atom: 250 ppm) manufactured by Zeon Corporation.
Carbon black (1): FEF (N550, $N_2SA$: 40 $m^2/g$) manufactured by Mitsubishi Chemical Corporation.
Carbon black (2): SEAST NH (equivalent to N351, $N_2SA$: 74 $m^2/g$) available from Tokai Carbon Co. Ltd.
Silica (1): Z115GR ($N_2SA$: 112$m^2/g$) available from RHODIA S.A.
Silica (2): Ultrasil VN 3 ($N_2SA$: 175 $m^2/g$, average particle diameter: 15 nm) available from Degussa Corporation.
Silane coupling agent: Si75 (bis(3-triethoxysilylpropyl)disufide) available from Degussa Huls Co.
Zinc oxide: Zinc Flower No.1 available from Mitsui MINING And SMELTING CO., LTD.
Stearic acid: Stearic Acid available from NOF Corporation.
Antioxidant: NOCRAC 6C available from OUCHISHINKO CHEMICAL INDUSTRIAL CO., LTD.
Wax: SUNNOC available from OUCHISHINKO CHEMICAL INDUSTRIAL CO., LTD.
Aroma oil: DIANAPROCESS AH-24 available from Idemitsu Kosan Co., Ltd.
Insoluble sulfur: SEIMISULFUR (insoluble sulfur by carbon disulfide: 60% and 10% of oil) manufactured by NIPPON KANRYU INDUSTRY CO., LTD.
Vulcanization accelerator TBBS: NOCCELER NS (N-tert-butyl-2-benzothiazylsulfenamide) available from OUCHISHINKO CHEMICAL INDUSTRIAL CO., LTD.

EXAMPLES 1 TO 9 AND COMPARATIVE EXAMPLES 1 TO 8

Table 1 represents preferable compoundings as a sidewall and tie gum and Table 2 represents preferable compoundings as a clinch. Chemicals excluding sulfur and a vulcanization accelerator were kneaded according to the compounding amounts shown in Tables 1 and 2 with a Banbury mixer. The compounding amounts shown in Tables 1 and 2 of sulfur and a vulcanization accelerator were added to the kneaded articles obtained, and the mixture was kneaded with an open roll to obtain uncured rubber compositions. Then, the uncured rubber compositions obtained were cured under the condition of 170° C. for 12 minutes to prepare the rubber sheets for test of Examples 1 to 9 and Comparative Examples 1 to 8 and tests shown below were carried out using the rubber sheets for test obtained.

(Viscoelasticity Test)

The complex elastic modulus E* and loss tangent tan δ of the cured rubber compositions at 30° C. was measured under the conditions of initial stain of 10%, dynamic strain of 2% and frequency of 10 Hz, using a viscoelasticity spectrometer manufactured by Iwamoto Seisakusyo K. K. Further, it is indicated that the larger the E* is, the higher the hardness is and the smaller the tan δ is, the more superior the low heat build-up is.

(Cutting Resistance)

The samples were scratched with a pendulum type impact notch tester for cutting resistance index, using a blade with a width of 20 mm made of steel and the depth of cutting scratch was measured. The cutting resistance index of Example 1 was referred to as 100 and the depth of cutting scratch of respective compoundings was displayed with indices by the under-mentioned calculation formula. It is indicated that the larger the cutting resistance index is, the more superior the cutting resistance is.

(Cutting resistance index)=(Depth of cutting scratch of Example 1)÷(Depth of cutting scratch of respective compoundings)×100

(Tensile Test)

Tensile test was carried out according to JIS K 6251 "Vulcanized rubber and Thermoplastic rubber—Determination method of Tensile property", using No. 3 dumbbell type test pieces comprising the fore-mentioned cured rubber compositions and elongation at break EB (%) was measured. It is indicated that the larger the EB is, the more superior the rubber strength is.

(Flex Crack Resistance)

Scratch of 2 mm was provided at the center of test samples, stimulation with an initial strain of 30% and repeated cycles of 2 million times was applied and evaluation was carried out with the size of crack growth. Results are shown in Tables 3 and 4. It is indicated that the smaller the value is, the better the flex crack resistance is.

(Rolling Resistance)

The rolling resistance of tires for test (size: 195/65R15 GTO65, tire for summer for an automobile) was measured under the conditions of rim size (15×6JJ), tire inner pressure (200 kPa), load (4.41 kN) and speed (80 km/h) using a rolling resistance tester. Further, the rolling resistance index of the tire of Comparative Example 1 was referred to as 100 and the rolling resistance of respective compoundings was displayed with indices by the under-mentioned calculation formula. Further, it is indicated that the smaller the rolling resistance index is, the lower the rolling resistance is reduced and the better the rolling resistance is.

(Rolling resistance index)=(Rolling resistance of respective compoundings)/(Rolling resistance of Comparative Example 1)×100

The above-mentioned evaluation results are shown in Tables 1 and 2.

Table 1 represents preferable compoundings as the sidewall and tie gum and Table 2 represents preferable compoundings as the clinch.

TABLE 1

| | Examples | | | | | Comparative Examples | | | | |
|---|---|---|---|---|---|---|---|---|---|---|
| Sidewall and tie gum compounding | 1 | 2 | 3 | 4 | 5 | 1 | 2 | 3 | 4 | 5 |
| Compounding amount (parts y mass) | | | | | | | | | | |
| NR | 40 | 70 | 40 | 40 | 40 | 40 | 70 | 40 | 40 | 40 |
| SPB-including BR | 30 | 15 | 30 | 30 | 30 | 30 | 15 | 30 | 30 | 30 |
| Modified BR | 30 | 15 | 30 | 30 | 30 | — | — | — | — | — |
| Tin terminal-modified BR | — | — | — | — | — | 30 | 15 | 30 | 30 | 30 |
| Carbon black (1) | 25 | 25 | 35 | 5 | 5 | 25 | 25 | 35 | 5 | 45 |
| Silica (1) | 20 | 20 | 10 | 40 | — | 20 | 20 | 10 | 40 | — |
| Silica (2) | — | — | — | — | 40 | — | — | — | — | — |
| Silane coupling agent | 1.6 | 1.6 | 0.8 | 3.2 | 3.2 | 1.6 | 1.6 | 0.8 | 3.25 | — |
| Zinc oxide | 3 | 3 | 3 | 3 | 3 | 3 | 3 | 3 | 3 | 3 |
| Stearic acid | 2 | 2 | 2 | 2 | 2 | 2 | 2 | 2 | 2 | 2 |
| Antioxidant | 2 | 2 | 2 | 2 | 2 | 2 | 2 | 2 | 2 | 2 |
| Wax | 1 | 1 | 1 | 1 | 1 | 1 | 1 | 1 | 1 | 1 |
| Aroma oil | 5 | 5 | 5 | 5 | 5 | 5 | 5 | 5 | 5 | 5 |
| Insoluble sulfur | 2.33 | 2.33 | 2.33 | 2.33 | 2.33 | 2.33 | 2.33 | 2.33 | 2.33 | 2.33 |
| Vulcanization accelerator TBBS | 0.8 | 0.8 | 0.8 | 0.8 | 0.8 | 0.8 | 0.8 | 0.8 | 0.8 | 0.8 |
| Evaluation result | | | | | | | | | | |
| E* 30° C. | 6.1 | 6.2 | 6.3 | 5.9 | 6.6 | 6.0 | 5.9 | 6.1 | 5.4 | 6.2 |
| tan δ 30° C. | 0.142 | 0.150 | 0.138 | 0.110 | 0.126 | 0.148 | 0.154 | 0.142 | 0.130 | 0.145 |
| Cutting resistance index | 100 | 120 | 95 | 135 | 145 | 90 | 115 | 95 | 105 | 75 |
| Elongation at break EB (%) | 520 | 580 | 510 | 600 | 640 | 495 | 550 | 480 | 550 | 450 |
| Flex crack resistance index | 105 | 95 | 105 | 115 | 120 | 100 | 85 | 95 | 110 | 80 |
| Tire rolling resistance index | 102 | 99 | 102 | 104 | 103 | 100 | 98 | 100 | 101 | 100 |

TABLE 2

| Clinch compounding | Examples | | | | Comparative Examples | | |
|---|---|---|---|---|---|---|---|
| | 6 | 7 | 8 | 9 | 6 | 7 | 8 |
| Compounding amount (parts y mass) | | | | | | | |
| NR | 35 | 35 | 35 | 35 | 35 | 35 | 35 |
| Tin terminal-modified BR | — | — | — | — | 45 | 45 | 45 |
| Modified BR | 45 | 45 | 45 | 20 | — | — | — |
| SPB-including BR | 20 | 20 | 20 | 45 | 20 | 20 | 20 |
| Silica (1) | 20 | 30 | 40 | 20 | — | 20 | 20 |
| Carbon black (2) | 30 | 20 | 10 | 30 | 50 | 30 | 30 |
| Silane coupling agent | 1.6 | 2.4 | 3.2 | 1.6 | — | 2.4 | 1.6 |
| Zinc oxide | 3 | 3 | 3 | 3 | 3 | 3 | 3 |
| Stearic acid | 2 | 2 | 2 | 2 | 2 | 2 | 2 |
| Antioxidant | 2 | 2 | 2 | 2 | 2 | 2 | 2 |
| Wax | 1 | 1 | 1 | 1 | 1 | 1 | 1 |
| Aroma oil | 8 | 8 | 8 | 8 | 8 | 8 | 8 |
| Insoluble sulfur | 2.5 | 2.5 | 2.5 | 2.5 | 2.5 | 2.5 | 2.5 |
| Vulcanization accelerator TBBS | 2.5 | 2.5 | 2.5 | 2.5 | 2.5 | 2.5 | 2.5 |
| Evaluation result | | | | | | | |
| E* 30° C. | 8.9 | 7.7 | 7.4 | 9.5 | 8.8 | 8.4 | 9.0 |
| tan δ 30° C. | 0.140 | 0.130 | 0.125 | 0.148 | 0.162 | 0.152 | 0.153 |
| Cutting resistance index | 110 | 115 | 120 | 130 | 100 | 110 | 100 |
| Elongation at break EB (%) | 340 | 360 | 380 | 310 | 280 | 340 | 260 |
| Flex crack resistance index | 110 | 125 | 135 | 100 | 100 | 105 | 90 |
| Tire rolling resistance index | 102 | 103 | 104 | 102 | 100 | 101 | 100 |

According to the present invention, a tire superior in low heat build-up, steering stability and durability by including specified diene rubber components and further including a specified amount of silica can be obtained.

What is claimed is:

1. A rubber composition for a tire comprising (B) 5 to 80 parts by mass of silica based on 100 parts by mass of (A) including (a) 10 to 60% by mass of a butadiene rubber including 2.5 to 20% by mass of 1,2-syndiotactic polybutadiene crystals, (b) 5 to 60% by mass of a modified diene rubber whose terminal is modified at a modification rate of 30 to 80% with a compound represented by the formula (1):

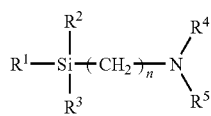

(1)

wherein $R^1$, $R^2$ and $R^3$ are same or different and are an alkyl group, an alkoxyl group, an acetal group, a carboxyl group, a mercapto group or a derivative thereof, $R^4$ and $R^5$ are same or different and are an alkyl group or a hydrogen atom and n is an integer, and (c) 20 to 75% by mass of a diene rubber other than (a) and (b).

2. The rubber composition for a tire of claim 1, wherein the vinyl content of the modified butadiene rubber (b) is at most 35% by mass.

3. The rubber composition for a tire of claim 1, used for a sidewall, a clinch, a base tread, a cushion or a tie gum.

4. A pneumatic tire using the rubber composition for a tire according to claim 1.

* * * * *